INVENTOR.
F. C. ADAMS, R. N. JONES
BY

United States Patent Office 3,418,085
Patented Dec. 24, 1968

3,418,085
APPARATUS FOR PRODUCING CHANNEL BLACK
Floyd C. Adams, Pampa, and Roy N. Jones, Skellytown, Tex., assignors to Cabot Corporation, Boston, Mass., a corporation of Delaware
Continuation-in-part of application Ser. No. 377,844, June 25, 1964. This application May 2, 1967, Ser. No. 650,558
3 Claims. (Cl. 23—259.6)

ABSTRACT OF THE DISCLOSURE

The present invention relates to an improvement in channel house equipment designed for the production of channel blacks. This improvement comprising suspending a plurality of free swinging chains from a series of points above the channels so that said chains extend down through the space between adjacent channels before terminating with their free ends below the channels. Said chains thus not only prevent build-up and bridging of carbon black upon and between the channels and other structural members of the channel table, but also remain clean and free of black deposits themselves due to the freedom of movement between the individual link members thereof.

---

The present application is a continuation-in-part of copending U.S. application Ser. No. 377,844, filed June 25, 1964, and now abandoned.

One of the problems inherent in channel black production processes involves a phenomenon known to those skilled in the art as "bridging." Briefly, bridging occurs when there is an accumulation of black in the space between adjacent channels which are located above the flames. When the bridging becomes excessive, the air circulation pattern of the hot house is adversely affected which in turn impairs the overall efficiency of the process and often deleteriously affects the quality of the product. Accordingly, down time is required to remove the accumulation of black between channels and in most cases, this removal is done manually. The problem of bridging is especially apparent in the oil enrichment channel black process such as is described in detail in U.S. Patent No. 2,719,078 to Billings et al., where the increased yields obtained accelerate the accumulation of black and require the removal thereof more frequently. For example, in a typical oil enrichment process, more often than not, high yields continue for only several days after removal of the accumulated black. Thereafter, the yield drops off quite appreciably and the removal operation must be repeated.

Another disadvantage of bridging is the effect the phenomenon has on the uniformity of the quality of black produced. Thus, when large amounts of black are retained for any length of time between adjacent channels—where the temperature is quite high—the black will become aftertreated and therefore the quality of that black, e.g. the surface characteristics, etc., differs from that of the black as it is normally produced. Accordingly, it will be apparent that any process or apparatus which will virtully eliminate bridging and the effects thereof in channel black processes—and especially in oil enriched channel black processes—would be indeed, a notable contribution to the art.

A principal object of the present invention is to provide an improved process and apparatus for producing channel type carbon blacks.

Another object of the present invention is to provide both process and apparatus for producing channel type blacks of improved uniformity.

Still another object of the present invention is to provide apparatus especially efficient for producing channel blacks by way of oil enrichment processes or like processes especially those characterized by high yields.

Other objects and advantages of the present invention will in part be obvious and will in part appear hereinafter.

Figure 1:
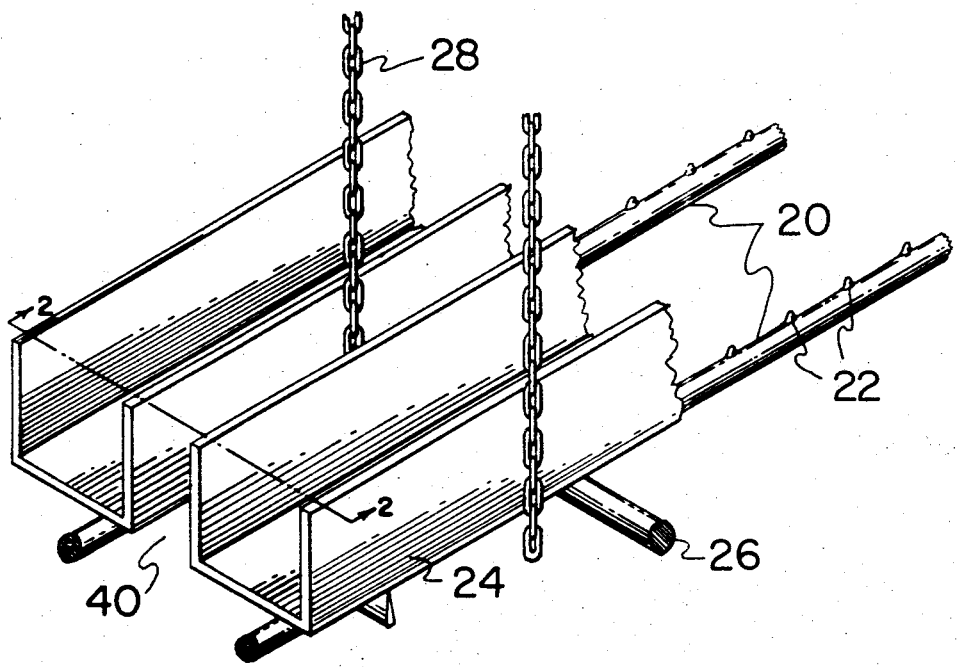
Figure 2:
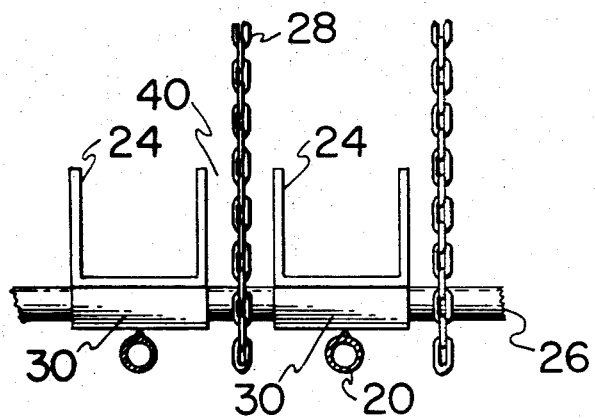

The above objects and advantages which flow from the practice of our invention and the manner in which same are realized will be better understood and appreciated by reference to the attached drawing in which FIGURE 1 illustrates typical interior channel house equipment in perspective together with a preferred embodiment of our improvement with portions of the equipment being cut away while FIGURE 2 is a view across line 2—2 of FIGURE 1.

Referring now to FIGURE 1, typical channel house equipment includes a plurality of burner pipes 20 which extend horizontally almost the entire length of the channel house. The burner pipes 20 are generally arranged adjacent each other and are equipped with a multiplicity of burner tips 22. The number of burner tips will vary but representative numbers for typical houses will run between about 2500 and about 3500 tips per building. Suspended directly above each burner pipe 20 is a channel 24. In present channel processes, the plurality of adjacent channels are usually supported by cross members 26 in the manner illustrated and such members are spaced at convenient intervals. The integral unit of adjacent channels 24 and cross members 26 is usually referred to in the art as a "channel table" or simply as a "table" and such tables are connected to reciprocating means (not shown) so that the table as a whole is able to reciprocate a certain distance horizontally along the length of the building. During operation of the process, the flame from burner tips 22 impinges on the under surface of channels 24 and the black is deposited upon said surface. The deposited black is continually removed from channels 24 by slowly reciprocating the channels or channel table over scrapers 30 (see FIGURE 2). The black after being scraped off falls into a series of hoppers (not shown) disposed beneath the pipes and channels and thence into some sort of conveyor means for ultimate recovery. Each hopper and the plurality of burner tips arranged directly thereabove are also generally considered as an integral unit and such a unit is known to those skilled in the art as a "bay."

During operation, the phenomenon of bridging occurs between adjacent channels such as at area 40 of FIGURE 2. The rate at which bridging will occur in any given process will depend primarily on the overall yield of the process but also to some extent on the nature of the black produced. Thus, bridging is an especially complicating factor in such processes as the aforesaid oil enrichment processes because of the higher than normal yields obtained. However, in accordance with our invention, the problem of bridging in any channel process is virtually eliminated. This is accomplished by placing between adjacent channels, a plurality of chains which continually sweep or otherwise remove from said channels black which accumulates thereon. The means illustrated in FIGURES 1 and 2 comprises a plurality of free swinging chains 28 suspended above and between channels 24. Chains 28 are of sufficient length to extend through the space between adjacent channels and terminate beneath the channels. For the purposes of the present specification and the claims appended hereto the term "chain" refers to any structure comprising a plurality of link members attached one to the other in serial and flexible relationship. We have found chains to be especially efficient and surprisingly advantageous in the practice of our invention. For example, chains offer little if any resistance to the reciprocating motion of the channels even when a cross member 26 is utilized as is the case in the greater portion of existing channel equipment. Of even greater importance, however, chains have been found to be substantially self-cleaning during operations and thus are not themselves subject to the problem of deposition of black product thereon. The reason for this very meaningful advantage is not fully understood; however, it is believed that said advantage is directly attributable to the peculiar working relationships of the chain links, i.e. their freedom to move substantially independently of one another. The number of chains placed between the same adjacent channels and the distance between the chains will vary but will depend largely upon the length of reciprocation of the channel or channel table. Normally, the distance between the chains which occupy the space between the same adjacent channels will generally not be greater than the distance said channels travel in one direction along the length of the channel house.

The following examples are offered to illustrate the advantages to be obtained in accordance with the practice of our invention and also to further illustrate representative operational details of the process and equipment involved. It is to be understood then that these examples are illustrative in nature and in no sense should they be construed so as to limit our invention beyond those limitations expressly set forth in the appended claims.

EXAMPLE 1

In a representative channel hot house equipped with about 3240 burner tips positioned under 12 channels, the total length of the channel table is about 130 feet while the travel of said table in one direction is about 9 feet. When said hot house is operated under typical conditions set forth in U.S. Patent No. 2,719,078, the unit produces daily about 550 lbs. of light nigrometer scale channel black. Such a yield based on the gallons of oil utilized amounts to a yield of about 1.4 lbs. of black per gallon of fuel.

EXAMPLE 2

Between each pair of adjacent channels in the above-described hot house, chains were installed at intervals of about 8 feet with each chain being positioned to hang between the respective adjacent channels and to extend through the space therebetween. Without any other change, that is, without changes in fuel or the rate at which same is introduced, etc., the yield based on gallons of oil utilized increased to 1.7 lbs. of black per gallon of fuel.

It will be obvious from the above that the practice of our invention leads not only to substantially increased yields but also when considered in light of the elimination of down time and the uniform quality of black obtained, the practice thereof greatly improves the overall efficiency of the channel black process.

Many modifications in the incidental features utilized to illustrate our invention may be accomplished without departing from the spirit and scope thereof. Therefore, the above-described disclosure, examples and the accompanying drawing should be regarded as illustrative and as not limiting the scope of the present invention.

Having described our invention together with preferred embodiments thereof, what we declare as new and desire to secure by U.S. Letters Patent is as follows:

1. In channel house apparatus of the type wherein a multiplicity of small burner tips are arranged so as to impinge smoky flames upon the undersides of a series of parallel channels supported by cross members to form a channel table which is regularly reciprocated horizontally while black is scraped off of said channels, the improvement which comprises a plurality of free swinging chains suspended from mountings above said channel table positioned so that each chain extends vertically downward through the open space between adjacent channels to a point below said channels.

2. The improved apparatus of claim 1 in which said apparatus includes means to feed a mixture of a normally liquid hydrocarbon and a normally gaseous hydrocarbon to said burner tip.

3. The improved apparatus of claim 1 wherein the distance between adjacent chains extending through the open space between any two adjacent channels is no more than the distance said channel table travels horizontally in one direction during reciprocation thereof.

References Cited

UNITED STATES PATENTS 2,719,078  9/1955  Billings et al. _____ 23—209.8
3,127,245  3/1964  Robertson _____ 23—209.8

OTHER REFERENCES

Neal et al.: "Carbon Black—Its Manufacture, Properties, and Uses," Bureau of Mines Bulletin 192, 1922, pages 15–21.

EDWARD J. MEROS, *Primary Examiner.*

U.S. Cl. X.R.

23—209.8